UNITED STATES PATENT OFFICE.

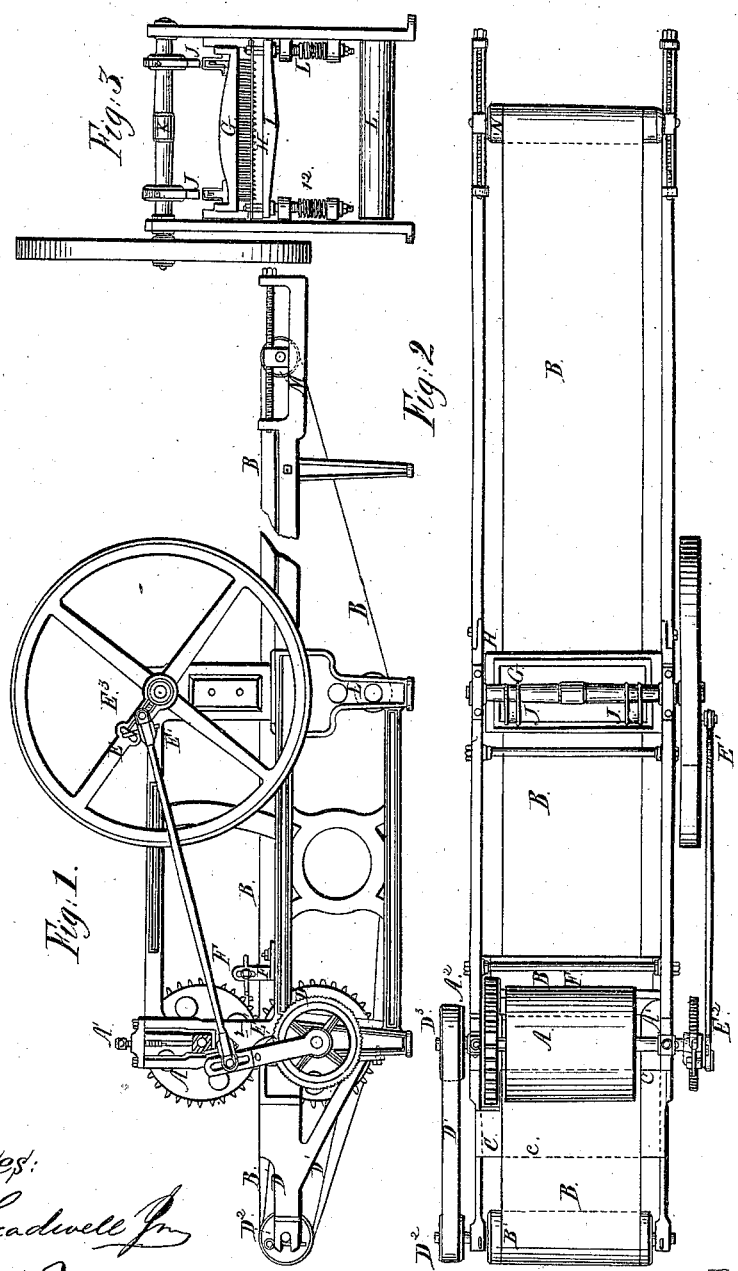

JOHN McCOLLUM, OF NEW YORK, N. Y.

CRACKER-MACHINE.

Specification of Letters Patent No. 22,966, dated February 15, 1859.

*To all whom it may concern:*

Be it known that I, JOHN McCOLLUM, of the city and county of New York, and State of New York, have invented certain new and useful improvements in machinery for flatting and docking the style of crackers commonly known as "hand" or "molded crackers," and which is applicable to the manufacture of ship-biscuit and loaf-bread; and I do hereby declare the following to be a full and exact description thereof and of the mode of operation, reference being had to the accompanying drawings, forming a part of this specification, and to the letters of reference thereon.

The nature of my invention consists in performing with the assistance of suitable combinations of mechanical devices hereinafter substantially described the operation of flatting and docking pellets of dough prepared by molding or in any suitable manner for the style of crackers known as "hand crackers."

To describe more particularly my invention I will refer to the drawings which represent the machine and in which—

Figure No. 1 is a side elevation of the machine. Fig. No. 2 a plan view, and Fig. No. 3, a transverse view of the machine showing the docking apparatus.

The machine consists of a flatting and a docking apparatus which operate in conjunction with each other and are connected and combined with each other by parts common to both and by the relative correspondence of motion each with the other.

The flatting apparatus consists of the adjustable rolling cylinder A with its doffer or stripper, the endless carrying apron B, the supporting table C, and the supporting or feed roller D in combination.

The rolling cylinder A is a plain smooth roller of cast iron or other suitable material to give a smooth surface to the cracker and is adjustable by set screws $A^1$, $A^2$ to accommodate different thickness of crackers. If only one thickness be required the adjusting screws may be dispensed with and the roller run in stationary journals. It is geared to the feed roller D by coupling cogwheels as usual with adjustable rollers having equal surface motion. The carrying apron B, which may be made of canvas or other suitable material with an even surface, is also geared to the feed roller D the connection being effected by the belt $D^1$ driven by a pulley $D^3$ on the end of the roller shaft D and driving a pulley $D^2$, on the end of the shaft of the driving pulley $B^1$ of the apron the diameter of the pulleys $D^2$ and $D^3$ relatively corresponding with the diameter of the roller D, and the driving apron pulley $B^1$ so as to impart equal surface motion to the apron with the rollers A and D.

The roller D is a plain cylinder rotating in journals in the side frames of the machine, and together with the parts connected with it receives an intermittent progressive forward motion from the crank or fly wheel arm E, (connected with the docking apparatus) by means of the crank pin and connecting rod $E^1$ and pawl and ratchet toothed wheel $E^2$ which last is secured to the shaft of the roller D. The length of the forward movement of the apron and rollers may be regulated by the adjusting screw $E^3$ which controls the position of the crank pin to which the connecting rod is attached. The distance moved may be governed by or correspond either with the width of the docker or the diameter of the cracker when flatted ready for docking and the crank or fly-wheel arm should be keyed on the crank shaft to which the docker is attached, in such a position as to commence the forward movement of the apron after the docker teeth shall have passed up through the clearer plate and the docker has commenced the upper half of its up stroke, and finish moving the apron when the docker has commenced the lower half of its downward stroke. This will permit of the cracker being docked and discharged properly while the apron is at rest.

The supporting table C is a flat sheet of metal of sufficient thickness to insure firmness, and is secured in a horizontal position to the side frames and fits closely the under surface of the carrying apron and extends to the feed roller D over and on which the apron moves. The plane of the upper surface of the supporting table is tangential or nearly so to the extreme upper surface or periphery of the roller D and parallel with the plane of its axis.

Letter F represents the doffer or stripper which is a flat plate of metal fitted up to the roller A and adjusted and secured by brackets and screws to the angle brackets $F^1$.

The office performed by the roller A is to flatten or press pellets of dough, previously properly prepared and arranged on the apron, as they pass under it. The office of the apron is to sustain and carry the pellets of dough to and under the roller A and from thence to and under and from the docker, acting in conjunction with its supports as an endless movable table on which the pellets of dough are progressively flatted and docked so as to form a finished cracker ready for the oven.

The office performed by the supporting bed or table C is that of supporting and sustaining the apron firmly as it passes to and under the flatting roller A, giving to that part of the apron supported by it, the capacity and firmness of a rigid movable table, for resisting the back pressure of the roller A on the pellet, and enabling the apron to present the pellets arranged on its surface, in the most favorable manner to the action of the flatting roller. Without this or an equivalent arrangement the order of the arrangement of the pellets on the apron would be disturbed by the flexibility of the apron. The office performed by the roller D is to assist the forward motion of the apron and also to support it under the pressure of the roller A when in action on the dough.

The office performed by the doffer is to release the flatted pellets of dough from the roller A, should any adhere thereto, so that they may pass forward on the apron in their regular and proper order. With this view it is important that the edge of the doffer plate shall be brought in contact with the periphery of the roller A in a line parallel with the plane of the apron and sufficiently close to the apron to prevent the cracker from rising far enough from it to become displaced when released by the doffer.
The docking apparatus consists of a reciprocating docker G, clearer plate H, the carrying apron B, and yielding bed or supporting plate I. The docker G consists of a platen working in the vertical guides G¹ and armed with pointed pins or teeth of equal length fastened in and projecting from the lower surface of the platen. It moves with a continuous reciprocating motion from the eccentric shaft K with which it is connected by connecting rods and straps J in the usual manner. This docker differs from the combined cutter and docker used in cracker cutting machines in respect that there are no cutters or molds on it, and that the absence of the molds permits of the arrangement of the teeth over the entire surface of the docker as may be desired.

The cleaner plate H is a flat plate of metal attached to the yielding bed plate in a plane parallel to the plane of the apron and bed plate and at a proper distance therefrom to disengage the crackers from the docker teeth (which pass through corresponding holes in the cleaner plate,) on the upward stroke of the docker without allowing the crackers to be lifted so high as to be disturbed in their order on the apron at the same time allowing sufficient room to feed in the crackers under the cleaner plate without coming in contact therewith.

The bed plate I is a stout plate of cast iron resting on pillars supported by adjustable springs I². The office of this bed plate is to support the apron firmly and evenly against the blow of the docker and also to sustain the clearer. Though not absolutely essential to the operation of docking, I consider it better to have an adjustable yielding pressure at the docking point as it enables the teeth to dwell an instant at the point of greatest pressure and so insures a complete perforation.

The office of the clearer plate I is to disengage the crackers from the docker teeth so that they can be carried regularly forward in proper order on the apron. The office of the docker is to perforate the crackers with holes for the escape of steam when baking.

The pulley M on which the apron runs is provided with set screws to regulate the tension of the apron and the pulley L is merely a friction pulley or fender to keep the apron from the springs of the bed plate I. My mode of operating the above described machinery to flat and dock pellets of dough is as follows, viz. I place the pellets which are first prepared of uniform size or nearly so, in regular order on the apron in front of the roller A allowing sufficient room between each to permit of the extension of diameter which occurs in flatting; the machine being in motion the pellets are carried under and flatted by the roller A and thence carried forward by the regular intermittent progressive movement of the apron to and under the docker when they are perforated or docked and from thence carried forward on the apron finished and ready for the oven.

Should the baker desire to dock the crackers exactly in the middle he may have the teeth arranged in clusters on the docker corresponding with the arrangement of the crackers on the apron and by properly adjusting the feed of the flatting apparatus and apron feed the crackers forward up to and under the clusters of teeth directly over their line of travel.

I am aware that sheets of dough have been rolled on endless tables, or bands, and also on endless bands or aprons passing between rollers; such are shown in Letters Patent granted to J. W. Post, March 14, 1840 also in Letters Patent to Humphrey Winslow Dec. 14, 1840, but this is not my object, neither are the above mentioned machines so arranged and organized as to be suitable for flatting and docking crackers. I am also aware that scrapers have been used in combination with plain rollers for various purposes in the arts and that they have been applied to plain cylinders for rolling dough for the purpose of stripping a continuous sheet of dough therefrom when it adheres thereto and therefore I do not wish to be understood as broadly claiming the use of a scraper, stripper or doffer for the purpose of relieving sheets of dough or dough in any shape from rollers to which it may adhere after being rolled; but I am not aware that a stripper or doffer has ever been applied in the manner hereinbefore described so as to relieve disconnected flatted pellets of dough from a roller without being materially disturbed in the order of their arrangement on the apron on which they are flatted. The difference in the operation being that it is not necessary to apply the edge of the scraper or doffer to any particular part of the roller in a line parallel to the axis thereof in case of stripping continuous sheets of dough because the weight of the sheet will when it is once released from the surface of the roller act to release the rest from the roller as it feeds from it and so materially assist the operation that the exact position of the doffer does not become a matter of necessity, whereas in the operation of rolling disconnected pellets of dough upon an apron if they are not released from the roller at a point that will admit of their being carried forward on the apron without materially deranging the order of their arrangement on the apron they will not go regularly forward to the docking apparatus. It is therefore evident that the doffer or stripper not only acts to prevent the pellets from being carried around the roller to interfere with those upon the apron just passing under the roller but also acts with reference to the subsequent operation of docking by preserving the order of the arrangement of the pellets of dough upon the apron. I am also aware that docked teeth have been arranged in self acting machines in combination with cups or molds for the purpose of cutting and docking crackers simultaneously from sheets of dough, which would defeat the object of my invention also that a self acting docker without accompanying cups but in combination with a clearer and presser is to be found in the application of F. Cheadwell Jr. and Henry McCollum filed in the Patent Office October 1852 but that differs from mine in respect that it is intended to flat pellets of dough as far as the spring of the clearer or presser plate will act before the docker teeth enter the cracker whereas the stationary clearer I use acts only to prevent the cracker from being carried up by the upward movement of the docker.

I claim—

1. In combination with the carrying apron B, the roller A, with its doffer F or the equivalent thereof, and the supporting or feed roller D and supporting table C or their substantial equivalents in the combination, the rollers and apron moving with simultaneous intermittent progressive motion, the whole being so arranged and operated substantially as hereinbefore set forth described and shown so as to progressively flat pellets of dough suitable for crackers, ship biscuit and similar articles, placed in proper order upon the apron and at suitable distances from each other to permit of the extension of diameter resulting from the operation as they pass under the roller A, without materially disturbing the order of their arrangement on the apron.

2. I claim the reciprocating docker in combination with the carrying apron, bed and stationary perforated clearer plate substantially as hereinbefore described and substantially for the purposes hereinbefore set forth and with or without adjustable springs in combination therewith to make yielding pressure at the docking point substantially as hereinbefore described.

3. I claim the flatting apparatus as hereinbefore set forth and described in the specification, and in the first claim, when combined with or used in combination with a docking apparatus such as is hereinbefore set forth and described in the specification and in the second claim, or the substantial equivalent thereof, when used combined and operated for the purpose of docking flatted pellets, of dough for crackers as they are progressively brought to and under the docker from the flatting apparatus without materially disturbing the order of their arrangement on the apron substantially as hereinbefore set forth and described.

JOHN McCOLLUM.

Witnesses:
   Daniel M. O'Brien,
   John M. Flynn.